(12) United States Patent
Toyama (10) Patent No.: US 7,536,791 B2
(45) Date of Patent: May 26, 2009

(54) MAGNET BIASED WORK TOOL (75) Inventor: Hideo Toyama, Niigata (JP)

(73) Assignee: Wakasaya Corporation, Sanjo-shi (JP)

( * ) Notice: Subject to any disclaimer, the term of this patent is extended or adjusted under 35 U.S.C. 154(b) by 309 days.

(21) Appl. No.: 10/584,329

(22) PCT Filed: Aug. 25, 2004

(86) PCT No.: PCT/JP2004/012200

§ 371 (c)(1),
(2), (4) Date: Jun. 26, 2006

(87) PCT Pub. No.: WO2005/060732

PCT Pub. Date: Jul. 7, 2005

(65) Prior Publication Data

US 2007/0144014 A1  Jun. 28, 2007

(30) Foreign Application Priority Data

Dec. 24, 2003  (JP) .................. 2003-426640

(51) Int. Cl.
B26B 13/16 (2006.01)
(52) U.S. Cl. ............... 30/254; 30/29; 30/120
(58) Field of Classification Search ............. 30/254, 30/29, 120; 200/277.2
See application file for complete search history.

(56) References Cited

U.S. PATENT DOCUMENTS 5,815,866 A * 10/1998 Janky .................. 7/114

(Continued)

FOREIGN PATENT DOCUMENTS

DE   912 080 C   5/1954

(Continued)

OTHER PUBLICATIONS

Supplementary European Search Report dated Aug. 23, 2007.

Primary Examiner—Kenneth E. Peterson
Assistant Examiner—Sean Michalski
(74) Attorney, Agent, or Firm—Kratz, Quintos & Hanson, LLP (57) ABSTRACT A work tool according to the invention is configured in such a manner that when an operator performs a predetermined operation by gripping a gripping section and opening/closing an active section, the opening and closing operation can be achieved smoothly without employing a spring by gripping the gripping section strongly and releasing the same because a repulsive force of magnets urges two pressure-nipping members in the direction in which the gripping section opens. The work tool according to the invention includes an active section 1 for performing cutting, formed on two pressure-nipping members A and B, the pressure-nipping members A and B being overlapped one on top of another and joined pivotably at respective mid-sections thereof so as to be crossed with respect to each other, the active sections 1 formed on distal end sides of a pivotal joint spot 2 of the respective mid-sections, and a gripping section 3 formed by the two pressure-nipping members A and B on proximal end sides of the pivotal joint spot 2 to be opened and closed for opening and closing the active sections 1, and is characterized in that magnets 4a, 4b are provided respectively on the two pressure-nipping members A and B at positions facing to each other in the vicinity of the pivotal joint spot 2 on a side of the gripping section 3 so as to be repulsive when being mounted with the same pole faced to each other.

2 Claims, 11 Drawing Sheets

U.S. PATENT DOCUMENTS

| | | | | |
|---|---|---|---|---|
| 6,151,785 | A * | 11/2000 | Morris | 30/206 |
| 6,725,546 | B1 * | 4/2004 | Dallas et al. | 30/193 |
| 7,111,402 | B1 * | 9/2006 | Pearman | 30/158 |
| 2005/0217118 | A1* | 10/2005 | Mah | 30/261 |
| 2006/0200996 | A1* | 9/2006 | Pearman | 30/158 |
| 2007/0144014 | A1* | 6/2007 | Toyama | 30/254 |

FOREIGN PATENT DOCUMENTS

| | | |
|---|---|---|
| DE | 3830934 A1 * | 3/1990 |
| JP | 56-28858 | 3/1981 |
| JP | 7-80164 | 3/1995 |
| JP | 10-244081 | 9/1998 |

* cited by examiner

MAGNET BIASED WORK TOOL

TECHNICAL FIELD

The present invention relates to a work tool such as cutting pliers, a cutting nipper, or pruning clippers.

BACKGROUND ART

A work tool, such as cutting pliers, a cutting nipper or pruning clippers includes two pressure-nipping members being overlapped one on top of another and joined at respective mid-sections thereof so as to be crossed and pivotable with respect to each other, an active section at a distal portion thereof for a nipping, cutting or bending operation, and a gripping section at a proximal portion thereof for allowing an operator to grip.

The work tool is used for performing a predetermined work at the active section that opens and closes in conjunction with the opening and closing operations of the gripping section, and are generally provided with a spring which urges the gripping section in the opening direction for improving operability of the gripping section, that is, to save energy for the opening operation at the gripping section done by the operator.

However, when the spring is employed, a resilient force thereof may be lowered or the spring may be damaged due to aged deterioration of the spring, and hence it is necessary to replace the spring periodically. In order to protect the operator from thecitis, it is desirable to reduce a force required for the operator to close the gripping section, that is, the elastic coefficient of the spring. However, when the elastic coefficient of the spring is reduced to a certain extent, there arises a problem such that a repulsive force sufficient for opening the closed gripping section by the spring cannot be obtained.

On the other hand, employment of a magnetic force of a magnet instead of a resilient force of the spring in the related art is proposed.

In other words, disclosed in Patent Document 1 is a tool in which magnets are provided at a pair of proximal ends of the gripping section of the two pressure-nipping members with the same pole faced to each other, and a repulsive force are generated when the pair of proximal ends come close to each other.

A tool disclosed in Patent Document 2 is further provided with a switching function in which a magnet on one of the pressure-nipping members rotates to maintain a state in which the pair of proximal ends of the gripping section attract each other and the active section is closed when being stored.

The work tools in which the magnets are employed are provided with the magnets at the pair of proximal ends of the gripping section. However, the attracting force or the repulsive force of the magnet is in inverse proportion to the square multiple of the distance between the magnets and there are not many work tools in heavy usage in which the pair of proximal ends of the gripping sections come close to each other to an extent which is abutment, and they are apart from each other in many of them. Therefore, even though the magnets are provided at the pair of proximal ends of the tool in this configuration, it is difficult to obtain a sufficient repulsive force after the gripping section is gripped.

In the work tool described in Patent document 2, since the magnets (the pair of proximal ends) are apart from each other even at the time of storage, the attracting force is small, and hence they do not have sufficient practicability. When magnets of strong magnetic force are employed to increase the repulsive force or the attracting force, since the respective magnets are located at ends of the tool, in particular, the magnet on the rotating side is located on the outside of the gripping section, metallic members such as other tools are attracted easily. Therefore, it is very troublesome to remove the attracted members.
Patent Document 1: JP-A-53-130600
Patent Document 2: JP-UM-B-60-1983

DISCLOSURE OF THE INVENTION

It is an object of the invention to provide a work tool in which a repulsive force at gripping sections can be obtained efficiently by magnets and adsorption of other members to the magnet can be restrained.

In order to achieve the object, a work tool according to the invention includes an active section formed on two pressure-nipping members, the pressure-nipping members being overlapped one on top of another and joined pivotably at respective mid-sections thereof so as to be crossed with respect to each other, the active section formed on distal end sides of a pivotal joint spot of the respective mid-sections for nipping or processing, and a gripping section formed by the two pressure-nipping members on proximal end sides of the pivotal joint spot to be opened and closed for opening and closing the active section, and is characterized in that magnets are provided respectively on the two pressure-nipping members at positions facing to each other in the vicinity of the pivotal joint spot on a side of the gripping section so as to be repulsive when being mounted with the same pole faced to each other.

Therefore, when an operator performs a predetermined operation by gripping the gripping section and opening/closing the active section, the opening and closing operation can be achieved smoothly without employing a spring by gripping the gripping section strongly and releasing the same because the repulsive force of the magnets urges the two pressure-nipping members in the direction in which the gripping section opens. In this case, since the magnets of the respective pressure-nipping members are provided in the vicinity of the pivotal joint spot, the magnets come extremely close to each other as the active section is closed, and in the state in which the active section is completely closed, the magnets are in the proximity or in abutment with each other, so that the repulsive force of the magnets can be utilized effectively. On the other hand, the operator can work against the repulsive force in the vicinity of the pivotal joint spot as described above easily by gripping the gripping section at a position apart from the pivotal joint spot, and hence the force required for closing the gripping section may be small.

The work tool according to the invention in the configuration described above may be configured in such a manner that the magnetic pole of one of the respective magnets provided on the two pressure-nipping members is changed so that the respective magnets are mounted with the opposite poles faced to each other, whereby the work tool is locked in the storage state in which the respective magnets attract each other and the active section is closed. The change of the magnetic pole of the magnet can be achieved, for example, by rotating the magnet, and by bringing the magnets mounted with the opposite poles faced to each other into abutment, the attracting force is maximized, and hence the effective locked state is realized.

Alternatively, in addition to the configuration described above, it is also possible to configure the work tool according to the invention in such a manner that a magnet is provided on one of the two pressure-nipping members so as to be capable of sliding and facing the other pressure-nipping member with the N-pole or the S-pole directed thereto, and magnets facing the one pressure-nipping member with the N-pole and the S-pole directed thereto respectively are provided on the other pressure-nipping member side by side, so that the operating state in which the nipping or processing by the active section is enabled is achieved by adjusting the sliding position of the magnet provided on the one pressure-nipping member so as to face the homopolar magnet provided on the other pressure-nipping member to cause the magnet provided on the one pressure-nipping member and the magnet provided on the other pressure-nipping member to be repulsive against each other, while the work tool is locked in the storage state in which the magnet provided on the one pressure-nipping member and the magnet provided on the other pressure-nipping member attract each other to close the active section by adjusting the sliding position of the magnet provided on the one pressure-nipping member so as to face the heteropolar magnet provided on the other pressure-nipping member. In this case as well, by bringing the magnet on the one pressure-nipping member into abutment with the heteropolar magnet on the other pressure-nipping member when they face with each other, the maximum attracting force is achieved, so that the effective locked state is realized.

Furthermore, in addition to the respective configurations described above, by making the respective magnets detachably attachable with respect to the two pressure-nipping members, assembly of the work tool is facilitated.

BEST MODE FOR CARRYING OUT THE INVENTION

Embodiments of the invention will now be described. In the respective embodiments, pruning clippers are exemplified as a work tool. However, the invention can be applied to nipping tools such as cutting pliers, a cutting tool such as a cutting nipper, and also to a tool for performing processing other than cutting (such as bending), as a mater of course. The work tools in the respective embodiments shown below are composed of two pressure-nipping members A and B at the normal work tools, and are provided with an active section 1 for performing a cutting operation at the distal end. The pressure-nipping members A and B are crossed at respective mid-sections thereof and are pivotably connected at the mid-sections thereof (a pivotal joint spot (pivotal joint part) 2 of the tool), and are provided with a gripping section 3 on proximal ends thereof so that the clipping operation is done by the active section 1 by opening and closing the gripping section 3.

In the respective embodiments shown below, a metallic blade portion which constitutes the active section 1 of the pressure-nipping member A is represented by a reference numeral 11a, a resin handle portion that constitutes the gripping section 3 is represented by a reference numeral 35a, a metallic blade portion which constitutes the active section 1 of the pressure-nipping member B is represented by a reference numeral 11b, and a resin handle portion which constitutes the gripping section 3 is represented by a reference numeral 35b.

FIRST EMBODIMENT

Figure 1:
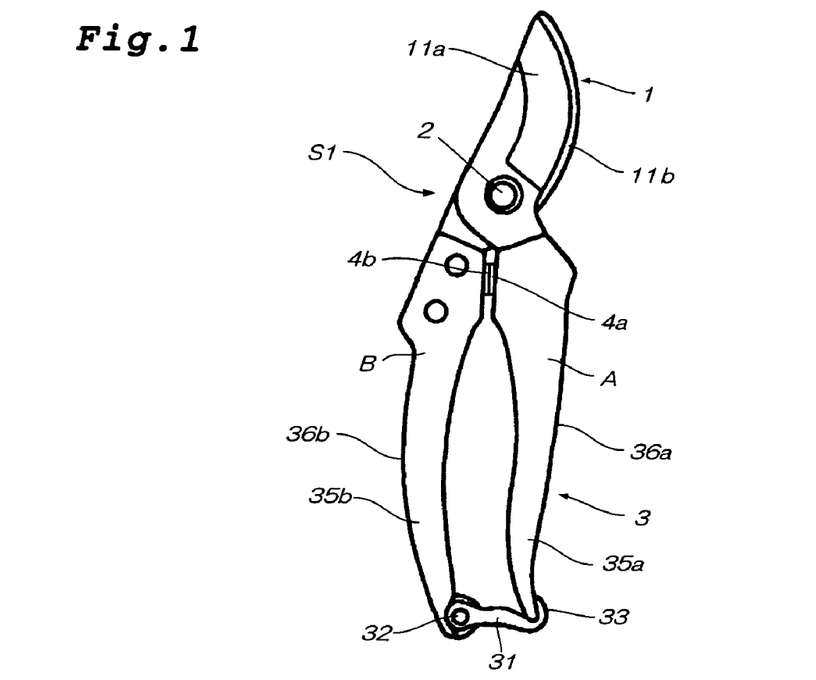
FIG. 1 is a front view of a work tool according to a first embodiment when being stored.
Figure 2:
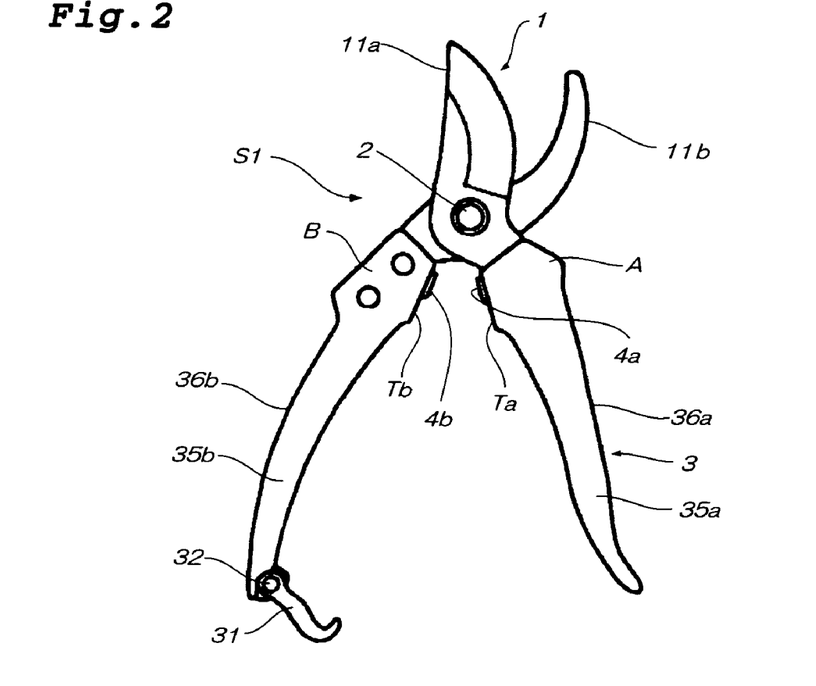
FIG. 2 is a front view of the work tool in FIG. 1 in the operating state.

FIG. 1 and FIG. 2 show a first embodiment of the invention. A work tool S1 of this embodiment includes magnets 4a, 4b embedded in opposed surfaces Ta, Tb of the pressure-nipping members A and B at positions close to the pivotal joint spot 2 of the tool than to gripping (grasping) positions 36a, 36b of the gripping section 3 with the same pole faced to each other.

In particular, at a proximal end of the gripping section 3 (handle portions 35a, 35b), a known lock lever 31 that prevents the gripping section 3 from opening is provided. The lock lever 31 is pivotably connected at the proximal end to the proximal end of the handle portion 35b (a pivotal joint spot 32 of the lever), and is formed with a hook portion 33 whose distal end can engage with the proximal end of the handle portion 35a.

The work tool S1 is used in the same manner as the normal work tool by releasing engagement of the hook portion 33 with respect to the lock lever 31. In particular, when the gripping section 3 is gripped with a strong force and then released, the handle portions 35a, 35b are urged in the opening direction by a repulsive force of the magnets 4a, 4b which are close to or abutted against each other, and hence the opening and closing operation can be achieved smoothly.

After usage, since the active section 1 (blade portions 11a, 11b) are in an opened state by the repulsive force of the magnets 4a, 4b in this state, the hook portion 33 of the lock lever 31 is engaged with the proximal end of the handle portion 35a and brings the pressure-nipping members A and B into the closed state for storage. In particular, in this engaged state (locking state), attenuation of the magnetic force can be restrained by maintaining the magnets 4a, 4b in an out-of-contact state.

SECOND EMBODIMENT

FIG. 3 to FIG. 7 show a second embodiment of the invention. A work tool S2 in this embodiment is configured in such a manner that the direction of one magnet 4b can be changed, and a magnet rotating part 5 in which the magnet 4b is mounted is assembled at a position facing the magnet 4a.

Figure 5:
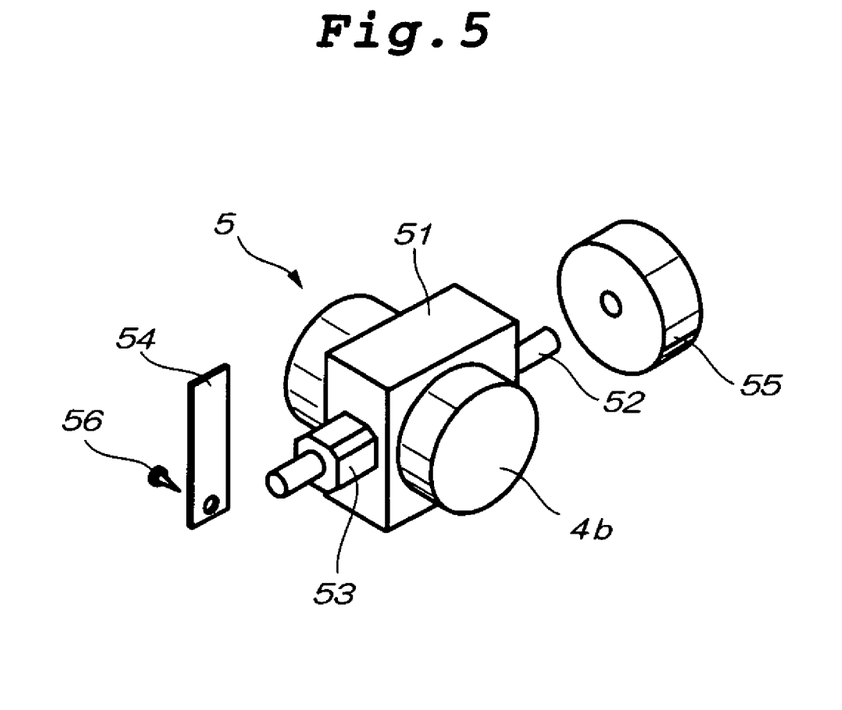
FIG. 5 is an exploded perspective view of a magnet retaining part of the work tool in FIG. 3 and FIG. 4.
Figure 6:
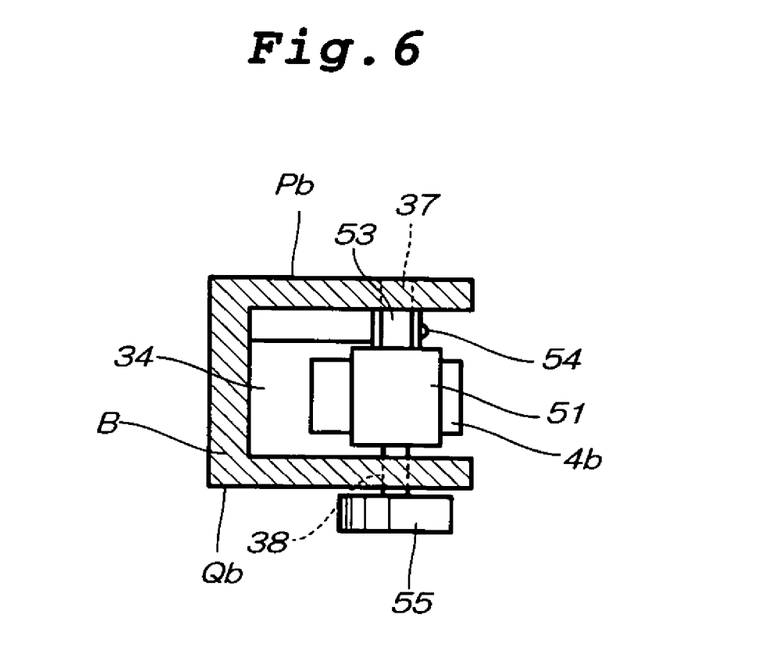
FIG. 6 is a cross-sectional view (plan view) in which the magnet retaining part in FIG. 5 is assembled.
Figure 7:
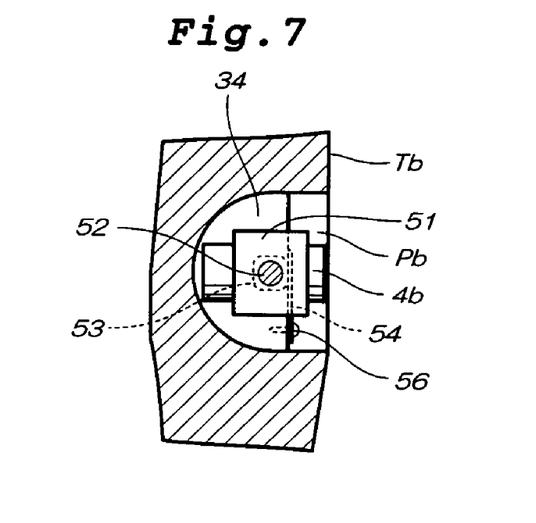
FIG. 7 is a cross-sectional view (front view) in which the magnetic retaining part in FIG. 5 is assembled.

The magnet rotating part 5 includes a magnet retaining portion 51, an operating shaft 52, a clicking shaft 53, a clicking leaf spring 54, and an operating tab 55.

The magnet retaining portion 51 retains the magnet 4b of a round column shape so as to expose the pole portions at both ends thereof. A magnet storage recess 34 is provided on the opposed surface Tb in the vicinity of the pivotal joint spot 2 of the tool on the gripping section 3 of the pressure-nipping member B, and shaft holes 37, 38 for communicating the inside and the outside of the recess 34 are formed on surfaces Pb, Qb which are orthogonal to the opposed surface Tb. The clicking shaft 53 is connected to the magnet retaining portion 51 in which the magnet 4b is mounted, then the entirety is placed in the recess 34 so that the clicking shaft 53 is inserted into the shaft hole 37, and the operating shaft 52 is inserted into the shaft hole 38 from the outside, thereby connecting to the magnet retaining portion 51. Consequently, the magnet retaining portion 51 can be rotated freely in the recess 34.

In particular, in consideration of rotation of the magnet retaining portion 51, the magnet rotating part 5 is assembled into the handle portion 35b of the pressure-nipping member B so that the magnet 4b and the magnet 4a come close to each other when they are mounted with the same pole faced to each other, and come into abutment with each other when they are mounted with the opposite poles faced to each other when the active section 1 is closed completely.

The operating shaft 52 is projected outward from the surface Qb of the gripping section 3, and the operating tab 55 is mounted to the projected portion. The clicking shaft 53 is formed into the column shape at a portion to be inserted into the shaft hole 37, and a portion located between the shaft hole 37 and a side surface of the magnet retaining portion 51 is formed into a rectangular column shape.

Furthermore, the clicking leaf spring 54 is formed into a rectangular shape, and one end in the longitudinal direction of the clicking leaf spring 54 is secured by a screw 56 to an adequate location in the recess 34 so that the other end in the longitudinal direction thereof presses the rectangular column portion of the clicking shaft 53.

Figures 3, 4:
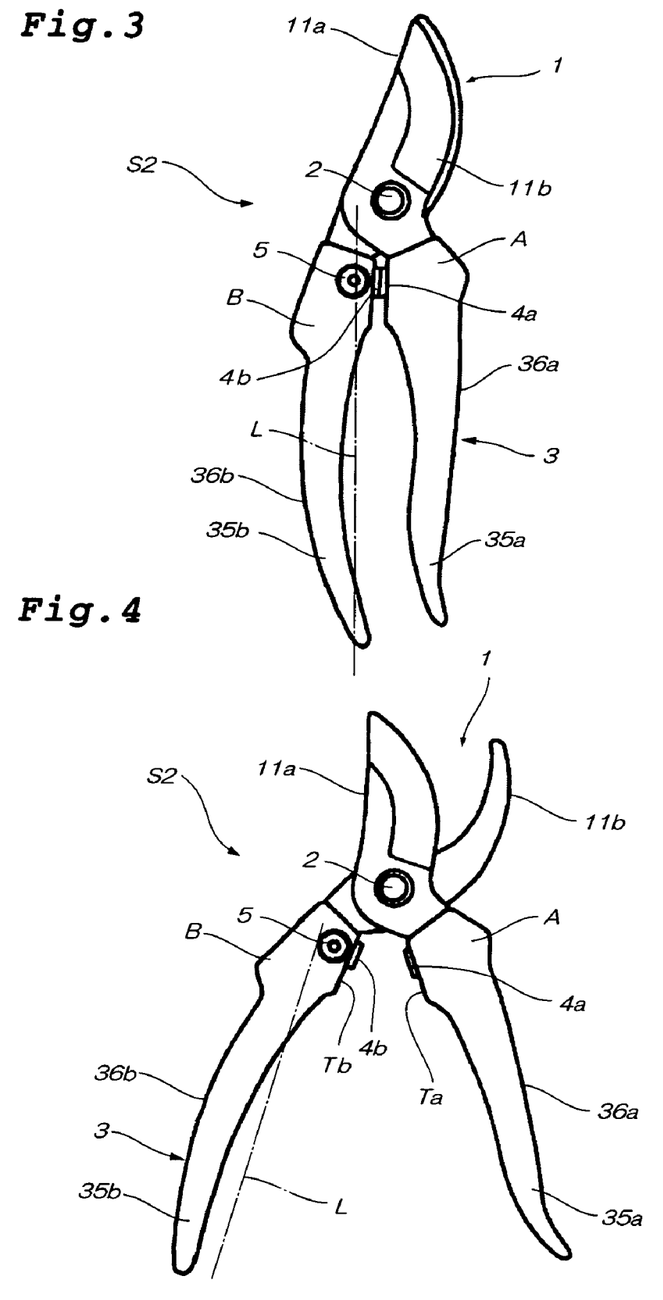
FIG. 3 is a front view of the work tool according to a second embodiment when being stored.
FIG. 4 is a front view of the work tool in FIG. 3 in the operating state.

The work tool S2 is configured in such a manner that the orientation of the magnetic pole of the magnet 4b can be selected by rotating the operating tab 55, and the selected position can be maintained by the clicking operation of the clicking shaft 53 and the clicking leaf spring 54 so that the operability of the gripping section 3 can be improved by utilizing the repulsive force of the magnets 4a, 4b by assuming the same-pole-facing position (an orientation in which the magnet 4b faces the magnet 4a with the same pole faced to each other) in the operating state, and the storage state in which the active section 1 is closed by the abutment and adsorption between the magnets 4a, 4b is achieved by assuming the opposite-pole-facing position (an orientation in which the magnet 4b faces the magnet 4a with the opposite poles faced to each other) when being stored.

In this embodiment, the magnet retaining part 5 is rotated (laterally rotated) about an axis of rotation in parallel with the pivotal joint axis of the tool (the axis vertical to a paper plane of FIG. 3 and FIG. 4). However, it is also possible to rotate (vertically rotate) the same about an axis of rotation extending along an extending direction L of the pressure-nipping member B.

THIRD EMBODIMENT

Figure 8:
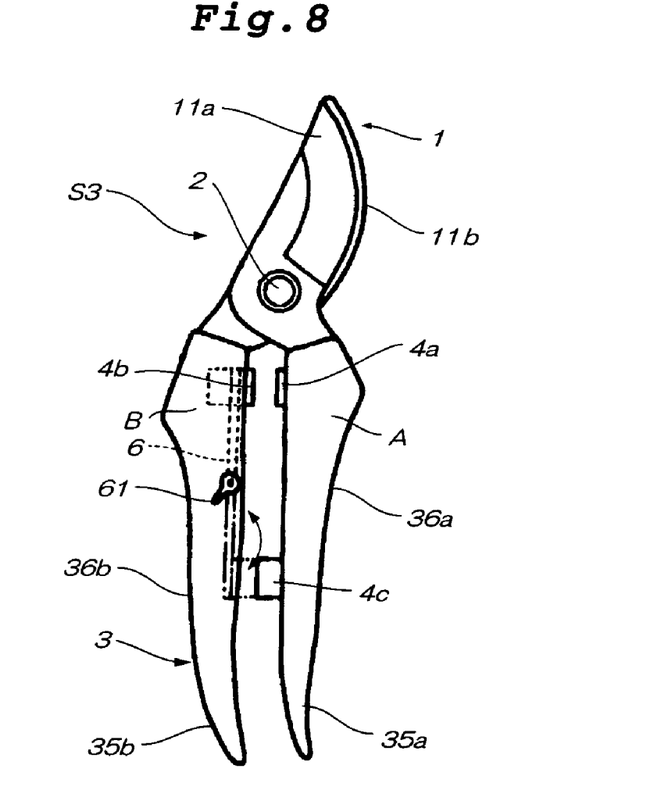
FIG. 8 is a front view of the work tool according to a third embodiment.
Figure 9:
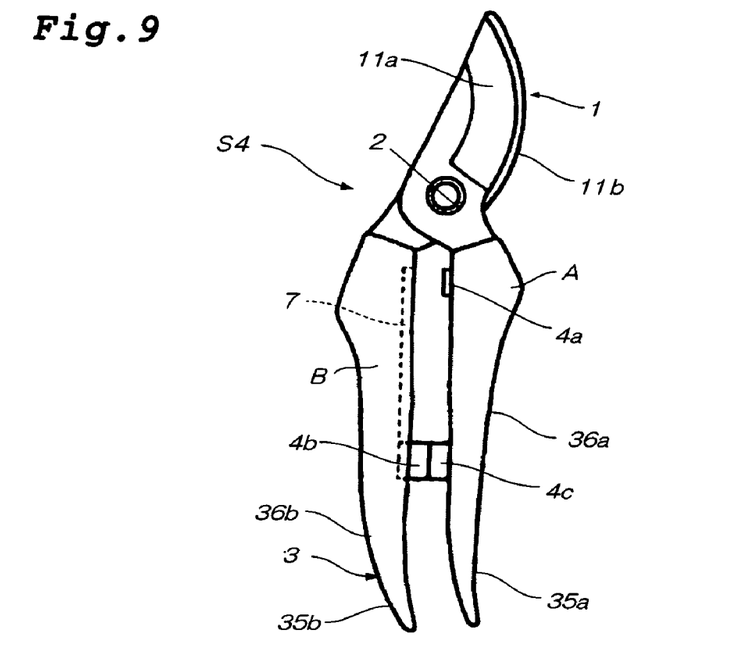
FIG. 9 is a front view of another example of the work tool according to the third embodiment in the stored state.
Figure 10:
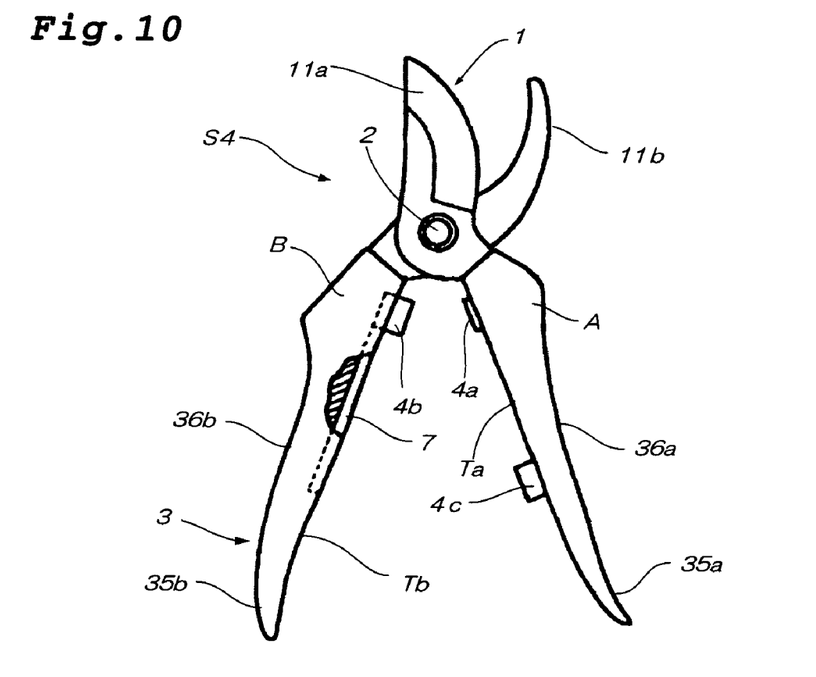
FIG. 10 is a front view of the work tool in FIG. 9 in the operating state.
Figure 11:
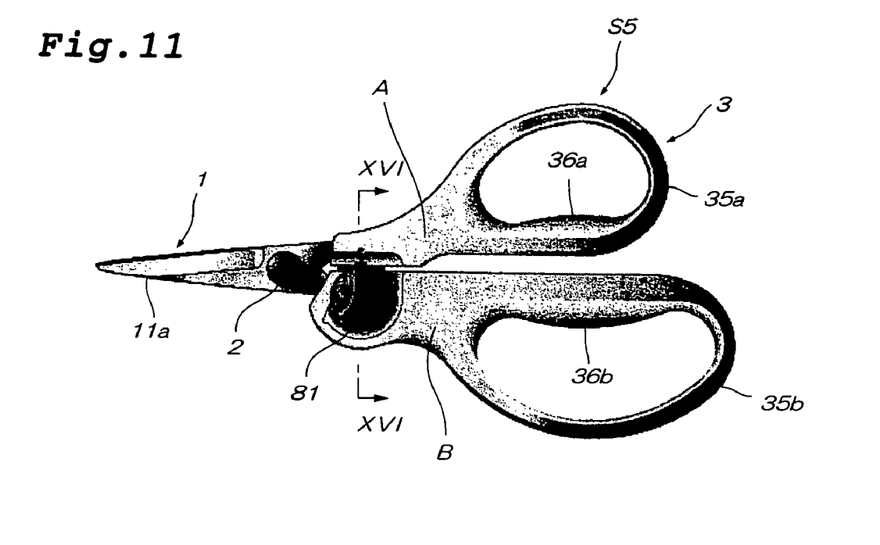
FIG. 11 is a front view of a first example of the work tool according to a fourth embodiment when being stored.
Figure 12:
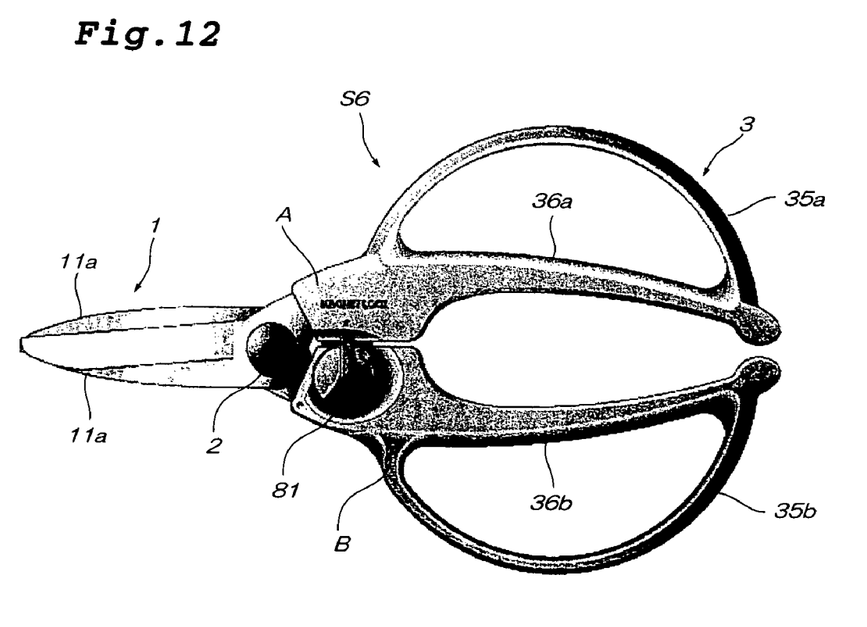
FIG. 12 is a front view of a second example of the work tool according to the fourth embodiment when being stored.
Figure 13:
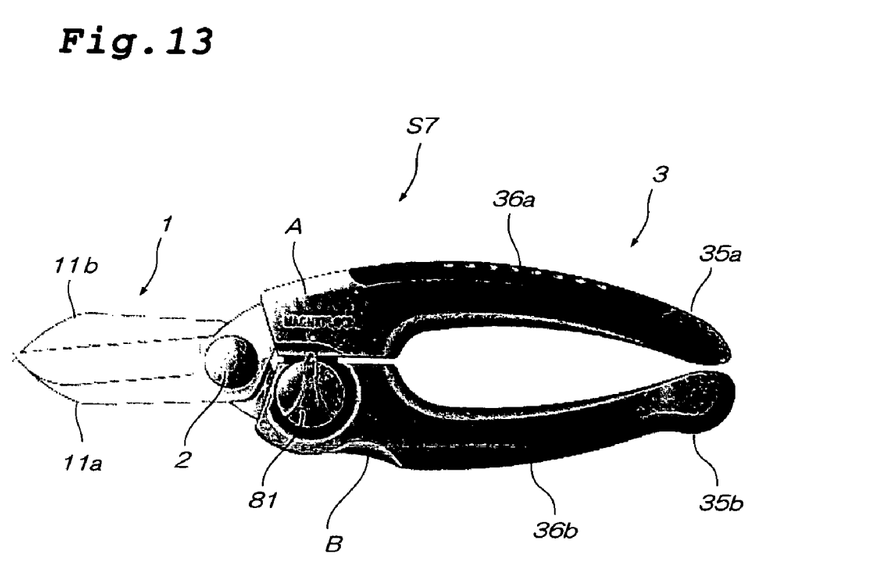
FIG. 13 is a front view of a third example of the work tool according to the fourth embodiment when being stored.

FIG. 8 to FIG. 10 show a third embodiment of the invention. Work tools S3, S4 in this embodiment are configured in such a manner that a plurality of magnets 4a, 4c are provided on one pressure-nipping member A, and the magnet 4b provided on the other pressure-nipping member B can be changed in position.

The work tool S3 is specifically configured in such a manner that the magnet 4b is mounted to a distal portion of a rotating arm 6 having an adequate length, a proximal portion of the rotating arm is pivotably connected (a pivotal joint spot 61 of the arm) to an adequate position of the gripping section 3 of the pressure-nipping member B so that the rotating arm 6 rotates in a plane extending in parallel with a paper plane in FIG. 8, the magnet 4a is mounted to the opposed pressure-nipping member A so as to face the magnet 4b with the same pole faced thereto when the rotating arm 6 is rotated toward the pivotal joint spot 2 of the tool, and the magnet 4c is mounted to the opposed pressure-nipping member A so as to face the magnet 4b with the opposite pole directed thereto when the rotating arm 6 is rotated toward the proximal portion of the tool.

Therefore, the rotating arm 6 is rotated to achieve the same-pole-facing position, the operability can be improved by the repulsive force between the magnets 4a, 4b in the operating state, and the storage state in which the active section 1 is closed is achieved by rotating the rotating arm 6 toward the proximal portion of the tool to achieve the opposite-pole-facing-position to cause the magnets 4b, 4c to come into abutment and to attract each other when stored.

The change of the position of the magnet 4b is not limited to the rotating arm described above, but may be achieved in such a manner that a sliding groove 7 is formed on the opposed surface Tb of the pressure-nipping member B for allowing the magnet 4b to be moved along the sliding groove 7 and fixed at predetermined positions (a position which causes a repulsive action and a position which causes an attracting action) as the work tool S4 shown in FIG. 9 and FIG. 10.

FOURTH EMBODIMENT

FIG. 11 to FIG. 16 show a fourth embodiment of the invention. Work tools S5, S6, S7 and S8 in this embodiment all have a common structure regarding the magnets 4a, 4b, although they are different in shape of the grip (the shape of the gripping section 3) and shape of the blade (the shape of the active section 1).

Figure 15:
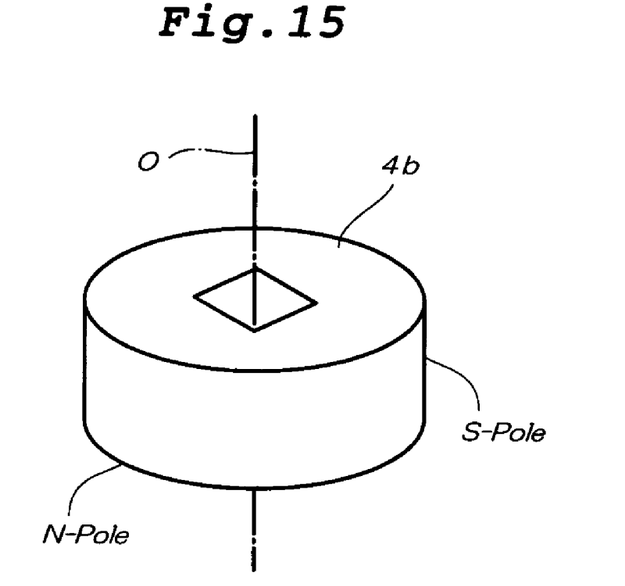
FIG. 15 is a perspective view of a magnet used in the respective work tools in FIG. 11 to FIG. 14.

The magnet 4a is a square-shaped magnet (see FIG. 16), and the N-pole faces the pressure-nipping member B in this case. The magnet 4b is an annular-shaped magnet as shown in FIG. 15, and has the N-pole on one side and the S-pole on the other side with respect to an axial line O interposed therebetween. The work tools S5, S6, S7 and S8 all include operating sections 81 on the pressure-nipping members B, so that the magnet 4b rotates about the axial line O by the rotational operation of the operating sections 81.

Figure 16:
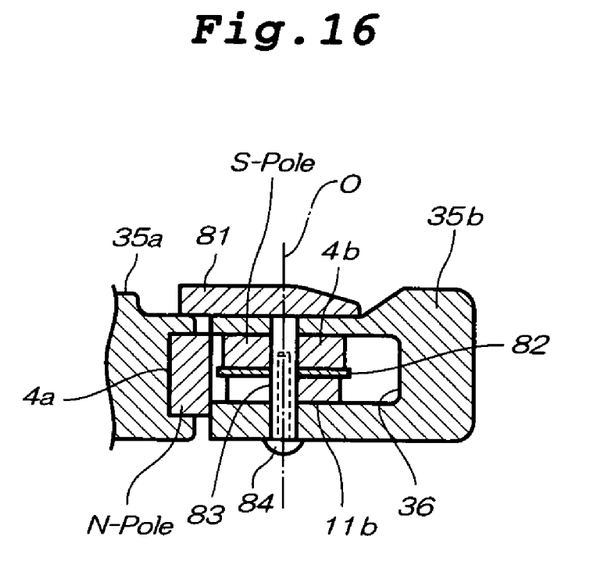
FIG. 16 is a cross-sectional view of the work tool in FIG. 11 taken along the line XVI-XVI.

In other words, as shown in FIG. 16 regarding the work tool S5 (it is the same for the work tools S6, S7, S8), a recess 36 is formed on the handle portion 35b of the pressure-nipping member B like the recess 34, and the magnet 4b, a shielding plate 82, an the blade portion 11b accommodated in a stacked state in the recess 36. The shielding plate 82 is formed of aluminum or polycarbonate for shielding a magnetic force, and prevents the magnet 4b and the blade portion 11b from attracting each other. The operating section 81 includes a cylindrical portion 83 extending downward from a bottom center, and a screw 84 is screwed from below into the cylinder of the cylindrical portion 83 in a state in which the cylindrical portion 83 penetrates the magnet 4b, the shielding plate 82 and the blade portion 11b in the recess 36 from above in FIG. 16, so that all these members are assembled. Provided between the cylindrical portion 83 and the magnet 4b is an anti-slippage structure (a structure in which when one of the cylindrical portion 83 and the magnet 4b rotate, the other one follows) by forming the outer shape of the cylindrical portion 83 or the inner shape of the annular ring of the magnet 4b into the angled shape, whereby the magnet 4b rotates about the axial line O independently from the handle portion 35b and the blade portion 11b by operating the operating section 81, so that the magnetic pole facing the pressure-nipping member A of the magnet 4b is changed.

Therefore, an operator can obtain the repulsive force between the magnets 4a, 4b by rotating the operating section 81 to change the magnetic pole facing the pressure-nipping member A of the magnet 4b into N-pole in the operating state, while he/she causes the magnets 4a, 4b to attract each other by changing the magnetic pole facing the pressure-nipping member A of the magnet 4b into S-pole by rotating the operating section 81, whereby the work tools S5, S6, S7, S8 can be locked into the storage state in which the blade portions 11a, 11b and the handle portions 35a, 35b are closed when not in use.

In the work tools S5, S6, S7 and S8 according to this embodiment, by rotating the magnet 4b having the N-pole and the S-pole on both sides of the axial line O about the axial line O, the magnetic pole can be changed over with a compact space near the pivotal joint spot 2 of the tool.

Figure 14:
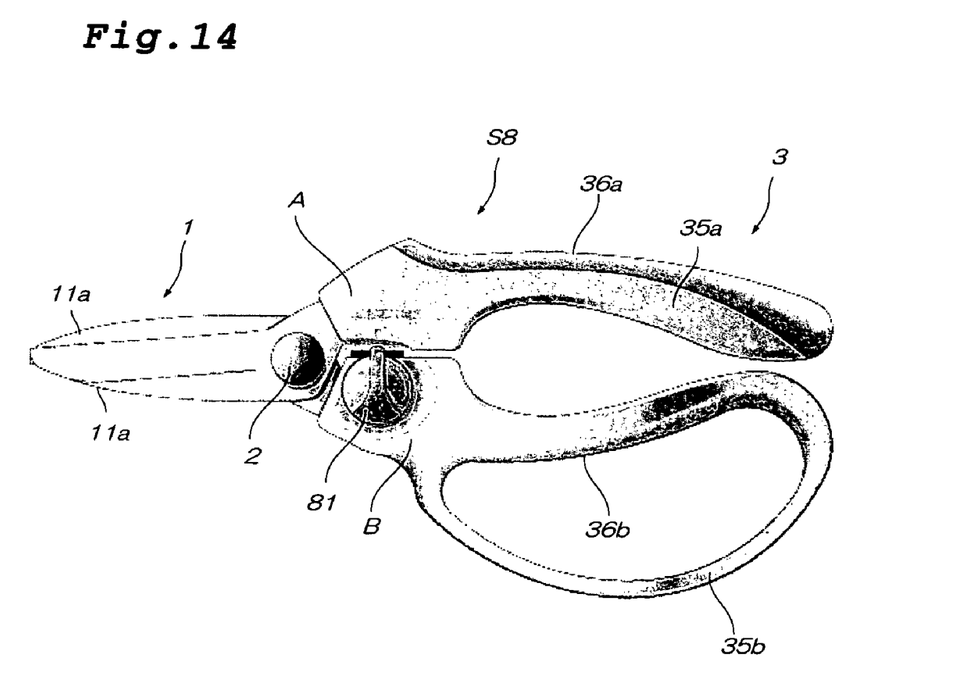
FIG. 14 is a front view of a fourth example of the work tool according to the fourth embodiment when being stored.

In the same manner as the above-described respective embodiments, since the repulsive force is obtained effectively by the magnets 4a, 4b in this embodiment as well, the handle portion which is not an annular shape (which has no portion to hook the dorsal surface of the finger) as the work tool S8 can be employed in combination with the annular handle portion for garden clippers, whereby the operator is prevented easily from gripping the garden clippers in a wrong way between the handle portion for the thumb and the handle portion for other fingers.

FIFTH EMBODIMENT

Figure 17:
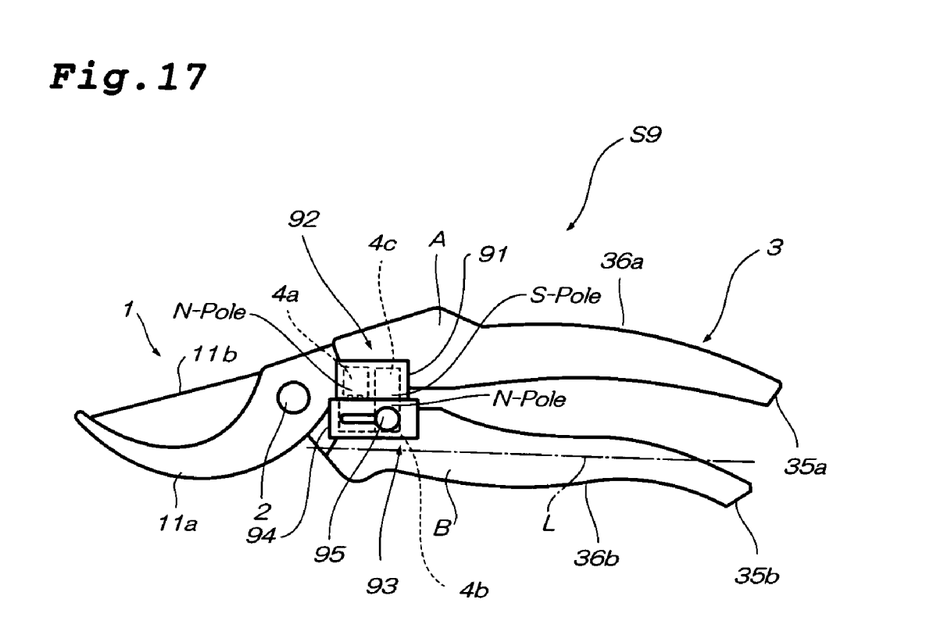
FIG. 17 is a front view of the work tool according to a fifth embodiment when being stored.
Figure 18:
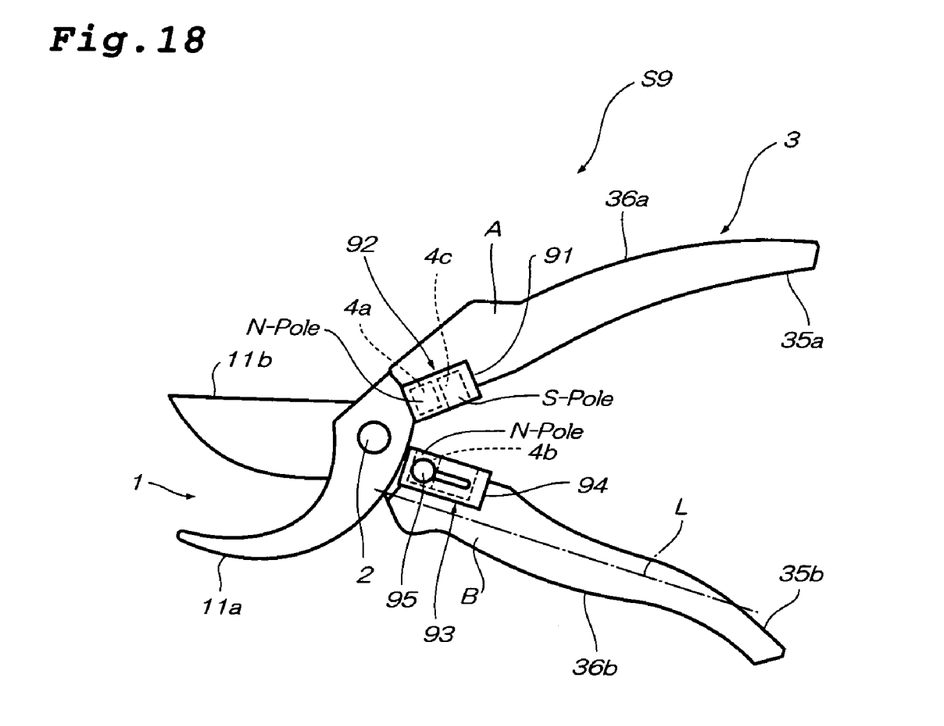
FIG. 18 is a front view of the work tool in FIG. 17 when being in the operating state.

FIG. 17 and FIG. 18 show a fifth embodiment of the invention. A work tool S9 in this embodiment includes the magnets 4a, 4b and 4c in the same manner as the work tool S4, and the magnet 4b slides to a position to face the homopolar magnet 4a to achieve the operating state, and the magnet 4b slides to a position to face the heteropolar magnet 4c to achieve the storage state. The difference of the work tool S9 from the work tool S4 is that the magnets 4a, 4c are both positioned side by side so as to be close to each other in the vicinity of the pivotal joint spot 2 of the tool, and that the magnets 4a, 4b and 4c are detachably mounted to the pressure-nipping members A and B.

More specifically, in the work tool S9, the square magnets 4a, 4c are provided on the pressure-nipping member A in this order from the side of the pivotal joint spot 2 of the tool, and the N-pole of the magnet 4a and the S-pole of the magnet 4c face the pressure-nipping member B. The magnets 4a, 4c are held by a holder 91 to constitute a magnet unit 92, and the magnet unit 92 is detachably mounted to the pressure-nipping member A with a screw, not shown.

On the other hand, a magnet unit 93 having the square magnet 4b is detachably mounted to the pressure-nipping member B with a screw, not shown. The magnet unit 93 includes a rectangular parallelepiped case 94 opening on one surface (a surface facing the pressure-nipping member A), the magnet 4b provided inside the case 94 so as to expose the N-pole from the opening and be capable of sliding in the case 94 along an extending direction L of the pressure-nipping member B, and an operating section 95 for adjusting the sliding position of the magnet 4b.

The operator can obtain the repulsive force of the magnets 4a, 4b, by operating the operating section 95 to slide the magnet 4b and adjust the sliding position thereof so as to face the magnet 4a in the operating state. The operator can lock the work tool S9 in the storage state, in which the blade portions 11a, 11b and the handle portions 35a, 35b are closed by causing the magnets 4b, 4c to attract each other by adjusting the sliding position so that the magnet 4b faces the magnet 4c by operating the operating section 95 when not in use.

In the work tool S9 according to this embodiment, since the both magnets 4a, 4c are provided in the vicinity of the pivotal joint spot 2 of the tool, the amount of movement of the magnet 4b for switching between the operating state and the storage state may be small and hence the switching by the operating section 95 can be achieved easily. The operation of the operating section 95 can be achieved easily with the thumb without re-gripping the work tool S9 again since the operating section 95 is positioned near the thumb when the operator grips the work tool S9.

Since the magnets 4a, 4b, 4c are detachably mounted to the pressure-nipping members A and B as the magnet units 92, 93, the magnets 4a, 4b and 4c can be mounted easily to the pressure-nipping members A and B when assembling the work tool S9. In other words, although assembling of the respective magnets is preferably performed at a last state of the assembly process for preventing attachment of dirt to the magnets, if an attempt is made to assemble the magnets in the complex state in an undetachable manner (for example, in a form shown in FIG. 16) after having joined the pressure-nipping members A and B in a pivotable manner, assembly cannot be achieved easily due to adsorption between the magnets or the like. In contrast, in this embodiment, since the respective magnets are provided so as to be detachably attachable as the magnet units, the good assembleability of the respective magnets with respect to the pressure-nipping members A and B is achieved. In addition, when the magnet is damaged, only the corresponding magnet unit can be replaced, and hence a good maintenanceability is achieved.

SIXTH EMBODIMENT

Figure 19:
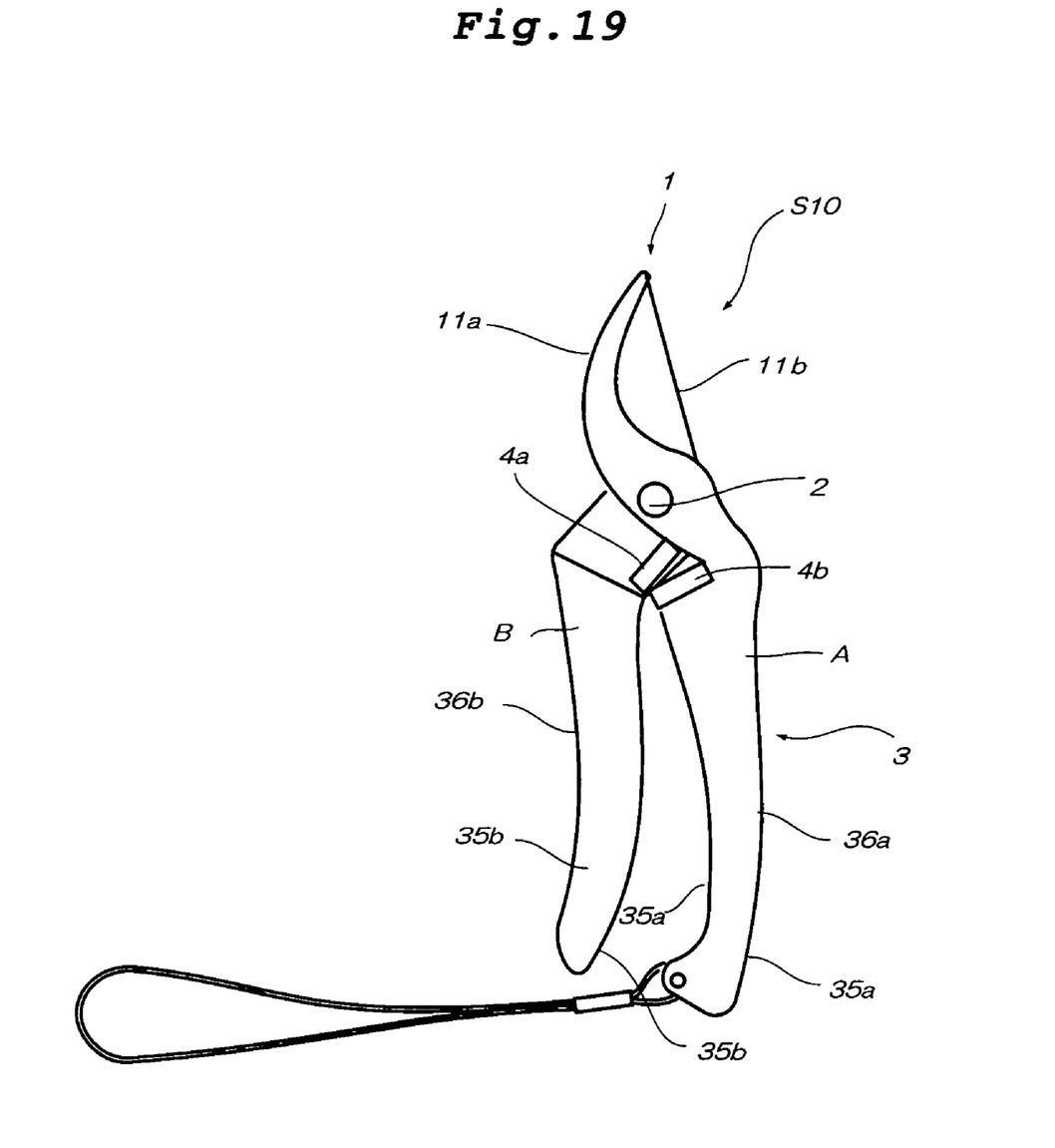
FIG. 19 is a front view of the work tool according to a sixth embodiment when being stored.
Figure 20:
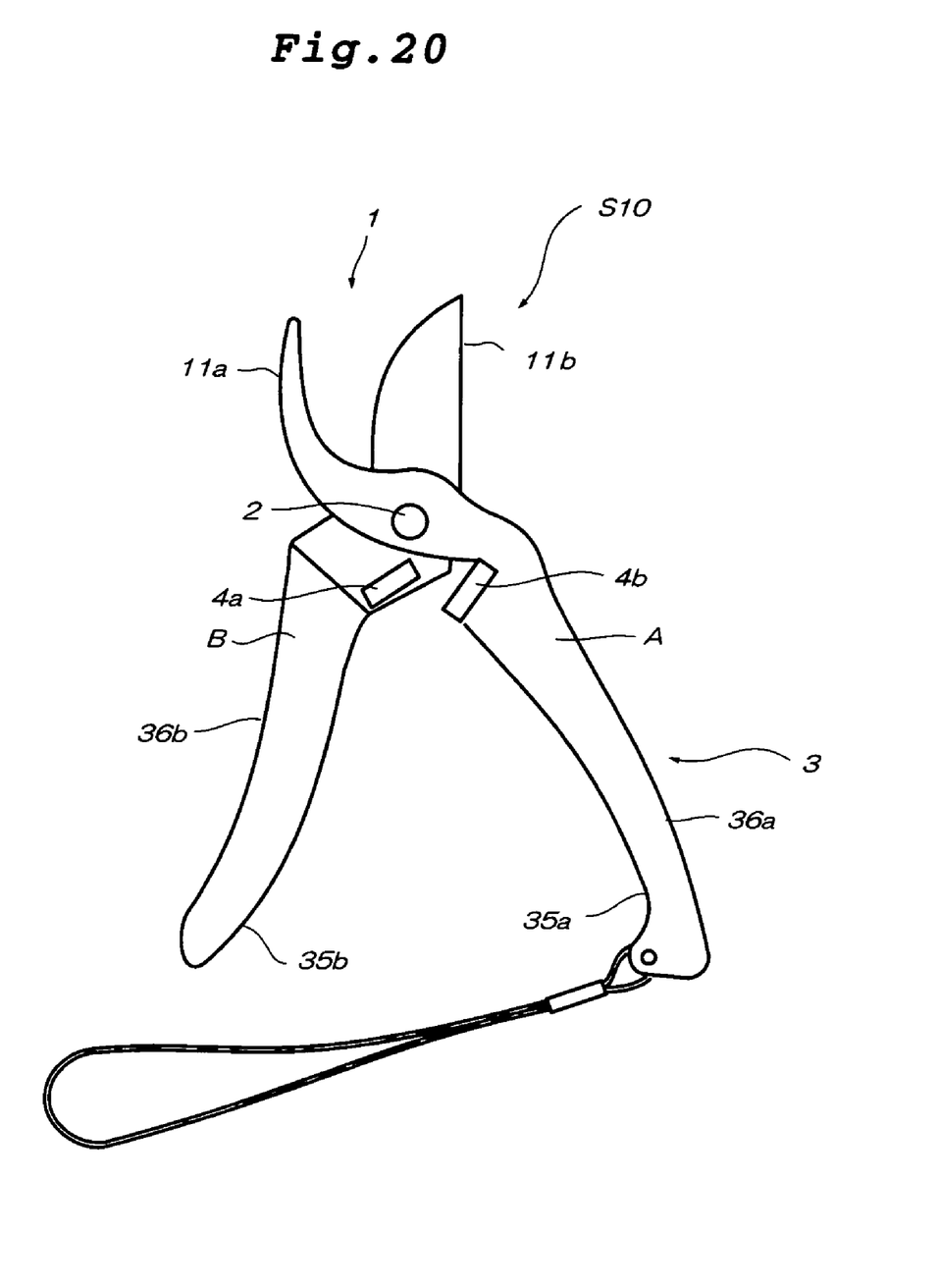
FIG. 20 is a front view of the work tool in FIG. 19 when being in the operating state.

FIG. 19 and FIG. 20 show the fifth embodiment of the invention. A work tool S10 in this embodiment is configured in such a manner that the magnets 4a, 4b are provided close to the pivotal joint spot 2 of the tool in comparison with other respective work tools shown above, the repulsive force between the magnets 4a, 4b can be generated further efficiently. The same parts described above are represented by the same reference numerals.

The invention claimed is:
1. A work tool comprising:
an active section formed on two pressure-nipping members, the pressure-nipping members being overlapped one on top another and joined pivotably at respective mid-sections thereof so as to be crossed with respect to each other, the active sections formed on distal end sides of a pivotal joint spot of the respective mid-sections for nipping or processing; and a gripping section formed by the two pressure-nipping members on proximal end sides of the pivotal joint spot to be opened and closed for opening and closing the active sections, characterized in that magnets are provided respectively on the two pressure-nipping members at positions facing to each other in the vicinity of the pivotal joint spot on a side of the gripping section so as to be repulsive when being mounted with the same pole faced to each other, in that a magnet is provided on one of the two pressure-nipping members so as to be capable of sliding and facing the other pressure-nipping member with the N-pole or the S-pole directed thereto, and magnets facing the one pressure-nipping member with the N-pole and the S-pole directed thereto respectively are provided on the other pressure-nipping member side by side, in that the operating state in which the nipping or processing by the active section is enabled is achieved by adjusting the sliding position of the magnet provided on the one pressure-nipping member so as to face the homopolar magnet provided on the other pressure-nipping member to cause the magnet provided on the one pressure-nipping member and the magnet provided on the other pressure-nipping member to be repulsive against each other, and in that the work tool is locked in the storage state in which the magnet provided on to one pressure-nipping member and the magnet provided on the other pressure-nipping member attract each other to close the active section by adjusting the sliding position of the magnet provided on the one pressure-nipping member so as to face the heteropolar magnet provided on the other pressure-nipping member.

2. The work tool according to claim 1, characterized in that the respective magnets provided on the two pressure-nipping members are detachably attachable with respect to the two pressure-nipping members.

* * * * *